United States Patent
Zhou et al.

(10) Patent No.: US 9,235,281 B2
(45) Date of Patent: Jan. 12, 2016

(54) TOUCH-SENSITIVE DEVICE WITH PROTECTION FUNCTION AND PROTECTION METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jian-Jun Zhou, Shenzhen (CN); Jun Zhang, Shenzhen (CN); Tsung-Jen Chuang, New Taipei (TW); Shih-Fang Wong, New Taipei (TW)

(73) Assignees: Fu Tai Hua (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 192 days.

(21) Appl. No.: 13/727,614

(22) Filed: Dec. 27, 2012

(65) Prior Publication Data
US 2013/0169572 A1    Jul. 4, 2013

(30) Foreign Application Priority Data
Dec. 28, 2011    (CN) .......................... 2011 1 0446530

(51) Int. Cl.
G06F 3/041 (2006.01)
G06F 3/0488 (2013.01)
G06F 21/31 (2013.01)

(52) U.S. Cl.
CPC .............. *G06F 3/041* (2013.01); *G06F 3/0488* (2013.01); *G06F 21/316* (2013.01)

(58) Field of Classification Search
None
See application file for complete search history.

(56) References Cited

U.S. PATENT DOCUMENTS

| | | | | |
|---|---|---|---|---|
| 5,844,325 A | * | 12/1998 | Waugh | H01M 10/122 307/10.7 |
| 7,231,231 B2 | * | 6/2007 | Kokko | G06F 3/0488 345/104 |
| 2004/0027336 A1 | * | 2/2004 | Ishii | B60R 25/102 345/169 |
| 2005/0052432 A1 | * | 3/2005 | Kraus | G06F 3/0421 345/173 |
| 2006/0199609 A1 | * | 9/2006 | Gay | G08B 25/016 455/556.1 |
| 2008/0117171 A1 | * | 5/2008 | Kwak | G06F 3/0236 345/168 |
| 2008/0167832 A1 | * | 7/2008 | Soss | G06F 3/0418 702/104 |
| 2008/0172633 A1 | * | 7/2008 | Jeon | G06F 3/04886 715/810 |
| 2008/0191861 A1 | * | 8/2008 | Mason | G08B 25/001 340/506 |
| 2008/0297469 A1 | * | 12/2008 | Drader | H04M 1/22 345/102 |
| 2008/0316030 A1 | * | 12/2008 | Deng | G08B 13/149 340/571 |
| 2009/0034804 A1 | * | 2/2009 | Cho | G06F 21/83 382/116 |

(Continued)

*Primary Examiner* — Seokyun Moon
*Assistant Examiner* — Josemarie G Acha, III
(74) *Attorney, Agent, or Firm* — Novak Druce Connolly Bove + Quigg LLP

(57) ABSTRACT

A method for protecting a touch-sensitive device includes: switching the touch-sensitive device from a normal mode to a protection mode when a preset operation is exerted; determining whether a touch operation is exerted after the touch-sensitive device enters the protection mode, and further determine whether a duration of the touch-sensitive device in the protection mode exceeds a preset time interval; comparing a touch size of the touch operation with a preset size when the duration of the touch-sensitive device in the protection mode exceeds the preset time interval; and generating an alarm signal when the touch size is less than the preset size. A related touch-sensitive device is also provided.

14 Claims, 2 Drawing Sheets

(56) References Cited

U.S. PATENT DOCUMENTS

| | | | |
|---|---|---|---|
| 2009/0166099 A1* | 7/2009 | Chen | G06F 1/1613 178/18.06 |
| 2009/0227232 A1* | 9/2009 | Matas et al. | 455/411 |
| 2010/0171607 A1* | 7/2010 | Sharma | G08B 25/14 340/501 |
| 2010/0182283 A1* | 7/2010 | Sip | G06F 1/1626 345/179 |
| 2010/0222049 A1* | 9/2010 | Kim | G06F 3/04883 455/418 |
| 2010/0225607 A1* | 9/2010 | Kim | G06F 3/042 345/173 |
| 2010/0240415 A1* | 9/2010 | Kim | G06F 3/03547 455/565 |
| 2010/0257490 A1* | 10/2010 | Lyon | G06F 3/0488 715/863 |
| 2010/0260388 A1* | 10/2010 | Garrett | G06Q 20/22 382/124 |
| 2010/0269040 A1* | 10/2010 | Lee | G06F 3/04817 715/702 |
| 2010/0289835 A1* | 11/2010 | Holub | G01J 3/02 345/690 |
| 2010/0325721 A1* | 12/2010 | Bandyopadhyay | G06F 21/316 726/19 |
| 2011/0018680 A1* | 1/2011 | Lai | E05C 19/166 340/3.1 |
| 2011/0041102 A1* | 2/2011 | Kim | G06F 3/04883 715/863 |
| 2011/0050602 A1* | 3/2011 | Jeong et al. | 345/173 |
| 2011/0063192 A1* | 3/2011 | Miller | G06F 1/1618 345/1.1 |
| 2011/0080367 A1* | 4/2011 | Marchand | G06F 1/3215 345/174 |
| 2011/0087523 A1* | 4/2011 | Earl | G06F 1/1626 705/12 |
| 2011/0095988 A1* | 4/2011 | Singhal | G06F 1/169 345/173 |
| 2011/0130170 A1* | 6/2011 | Han | G06F 1/1694 455/566 |
| 2011/0134061 A1* | 6/2011 | Lim | G06F 3/016 345/173 |
| 2011/0148668 A1* | 6/2011 | Li | G06F 3/0418 341/20 |
| 2011/0167363 A1* | 7/2011 | Kinoshita | G06F 3/048 715/763 |
| 2011/0239281 A1* | 9/2011 | Sovio | H04L 63/0815 726/5 |
| 2011/0241973 A1* | 10/2011 | Manning | G06F 1/1616 345/1.3 |
| 2011/0246951 A1* | 10/2011 | Chen | G06F 3/04883 715/863 |
| 2011/0249006 A1* | 10/2011 | Wallace | A61M 16/0051 345/440 |
| 2011/0256848 A1* | 10/2011 | Bok et al. | 455/411 |
| 2011/0260829 A1* | 10/2011 | Lee | G06F 3/0414 340/5.51 |
| 2011/0265045 A1* | 10/2011 | Hsieh | G06F 3/04883 715/863 |
| 2011/0279169 A1* | 11/2011 | Salaverry | G06F 3/0416 327/517 |
| 2011/0291944 A1* | 12/2011 | Simmons | G06F 3/0416 345/173 |
| 2011/0302649 A1* | 12/2011 | Foster | G06F 21/36 726/19 |
| 2012/0033140 A1* | 2/2012 | Xu | H04N 21/42224 348/734 |
| 2012/0062488 A1* | 3/2012 | Lin | G06F 3/0418 345/173 |
| 2012/0075212 A1* | 3/2012 | Park | G06F 3/04886 345/173 |
| 2012/0105358 A1* | 5/2012 | Momeyer | G06F 3/0414 345/174 |
| 2012/0110662 A1* | 5/2012 | Brosnan | G06K 9/00006 726/19 |
| 2012/0127105 A1* | 5/2012 | Kim | H04M 1/67 345/173 |
| 2012/0154301 A1* | 6/2012 | Kang | G06F 3/04886 345/173 |
| 2012/0167202 A1* | 6/2012 | Kim | G06F 21/42 726/19 |
| 2012/0182253 A1* | 7/2012 | Brosnan | 345/174 |
| 2012/0191993 A1* | 7/2012 | Drader et al. | 713/320 |
| 2012/0194452 A1* | 8/2012 | Cho | G06F 3/0416 345/173 |
| 2012/0200515 A1* | 8/2012 | Yamada | G06F 1/1626 345/173 |
| 2012/0223906 A1* | 9/2012 | Zhou | G06F 3/0416 345/173 |
| 2012/0225697 A1* | 9/2012 | Lee | H04M 1/67 455/566 |
| 2012/0229406 A1* | 9/2012 | Wu | G06F 3/04886 345/173 |
| 2012/0235790 A1* | 9/2012 | Zhao | G06F 21/32 340/5.83 |
| 2012/0258773 A1* | 10/2012 | Alvarez Rivera | G06F 1/1656 455/556.1 |
| 2012/0280917 A1* | 11/2012 | Toksvig | G06F 1/1626 345/173 |
| 2012/0293523 A1* | 11/2012 | Miyashita | H04M 1/72586 345/522 |
| 2012/0299856 A1* | 11/2012 | Hasui | G06F 3/0418 345/173 |
| 2012/0306927 A1* | 12/2012 | Lee | G06F 3/041 345/660 |
| 2013/0067554 A1* | 3/2013 | Alessio | G06F 3/0236 726/7 |
| 2013/0069897 A1* | 3/2013 | Liu | G06F 3/0488 345/173 |
| 2013/0278524 A1* | 10/2013 | Wang | G06F 3/0416 345/173 |
| 2013/0347099 A1* | 12/2013 | Smith | G06F 21/316 726/19 |

\* cited by examiner

TOUCH-SENSITIVE DEVICE WITH PROTECTION FUNCTION AND PROTECTION METHOD

BACKGROUND

1. Technical Field

The present disclosure relates to touch-sensitive devices and, particularly, to a touch-sensitive device with protection function and a method for providing the touch-sensitive device.

2. Description of Related Art

Portable devices, for example, smart phones, are easily suffered from theft. If a portable device having important personal information is lost, a great loss may bring to the owner of the portable device. Therefore, a protection function for a mobile device to safeguard against theft of the device would be desirable.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
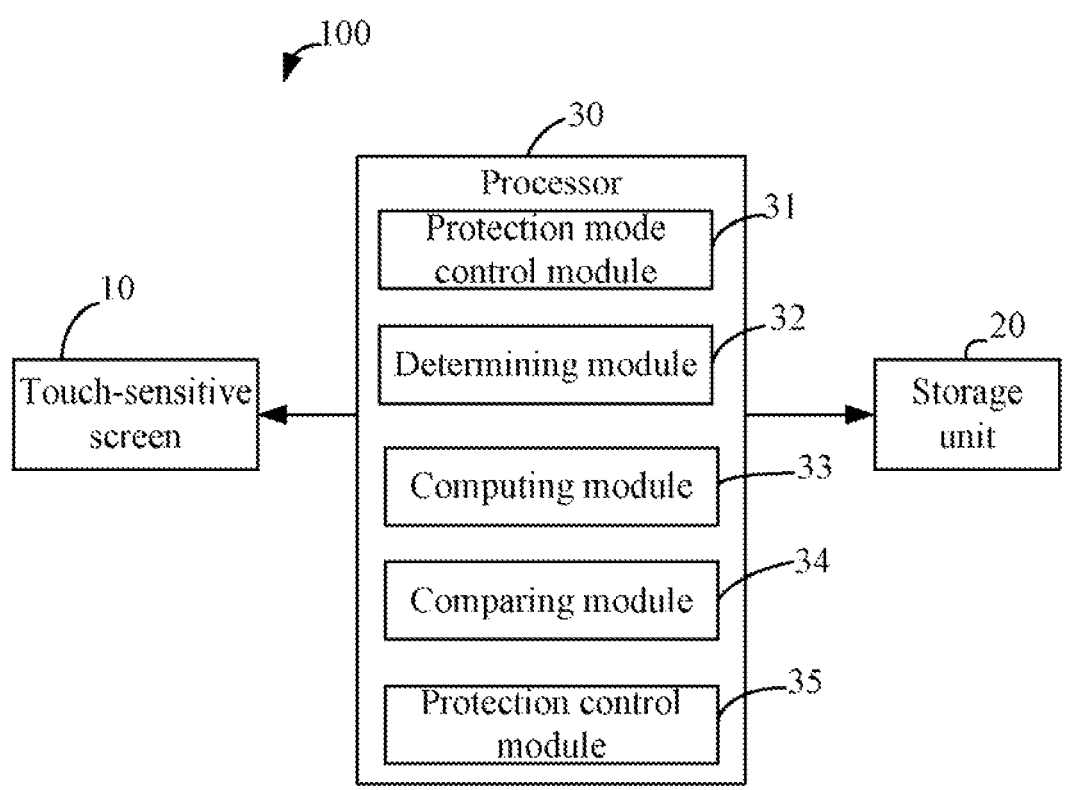
FIG. 1 is a block diagram of a touch-sensitive device with protection function, in accordance with an exemplary embodiment.

Referring to FIG. 1, an embodiment of a touch-sensitive device 100 with a protection function is illustrated. The device 100 includes a touch-sensitive screen 10, a storage unit 20, and a processor 30. The storage unit 20 stores a preset size and a preset region of the screen 10, which are employed to determine whether to generate an alarm signal for protecting the device 100. For better understanding the present disclosure, a simple introduction of why using a preset size and a preset region to protect the device 100 is given. When an owner of the device 100 takes the device 100 from his/her pocket or bag, he/she usually grasps a relatively larger portion of the device 100, thus a larger size of the screen 10 may be touched. However, when a thief steals the device 100, he/she usually uses a clamp to clamp the device 100, thus a smaller size of the screen 10 may be touched. Therefore, touch size of the screen 10 may be employed to determine whether the device 100 is being stolen. Furthermore, when the owner of the device 100 takes the device 100 from his/her pocket or bag, he/she may almost grasp a same portion of the device 100 each time. Thus, the device 100 can also determine whether a touch region is within a preset region of the screen 10 which may usually touch by the owner when taking the device 100 out to determine whether the device 100 is being stolen.

In this embodiment, the processor 30 includes a protection mode control module 31, a determining module 32, an updating module 33, a comparing module 34, and a protection control module 35.

The protection mode control module 31 switches the device 100 from a normal mode to a protection mode when a preset touch operation is exerted on the screen 10. The preset touch operation may be sliding from a left edge of the screen 10 to a right edge of the screen 10.

The determining module 32 determines whether a touch operation is exerted on the screen 10 after the device 100 enters the protection mode. When a touch operation is exerted on the screen 10, the determining module 32 further determines whether a duration of the device 100 in the protection mode exceeds a preset time interval.

The updating module 33 updates the preset size and the preset region according to a touch size and a touch region of the touch operation when the duration of the device 100 in the protection mode is less than or equal to a preset time interval. For example, the updating module 33 deletes the preset size from the storage unit 20, and regards an average of the preset size and the touch size as a new preset size.

The comparing module 34 compares the touch size and the touch region with the preset size and the preset region when the duration of the device 100 in the protection mode exceeds the preset time interval.

The protection control module 35 generates an alarm signal when the touch size is less than the preset size, or when the touch size is equal to or greater than the preset size, and the touch region is not within the preset region. The alarm signal may be a ringtone, a vibration signal, or a combination of a ringtone and a vibration signal. The protection mode control module 31 further switches the device 100 from the protection mode to the normal mode when the touch size is equal to or greater than the preset size, and the touch region is within the preset region.

When the device 100 is taken out from a pocket of an owner of the device 100 by a thief, the size and region touched on the screen 10 may be very different from the touch size and touch region when the device 100 is taken out by the owner. Thus, with such configuration, the device 100 can automatically determine whether the device 100 is taken by the owner, and generates an alarm signal when the device 100 is not taken by the owner to protect the device 100 from theft.

Figure 2:
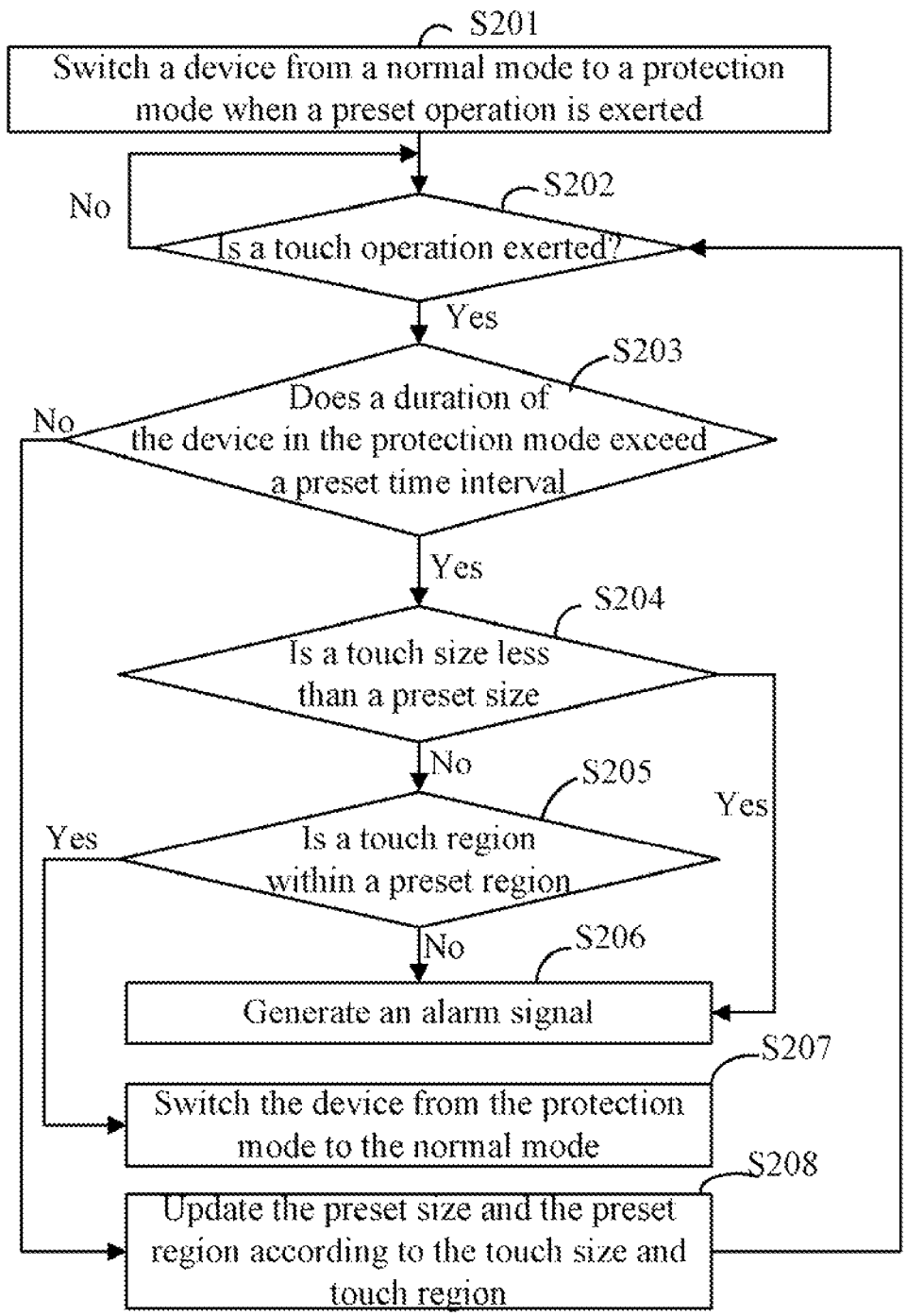
FIG. 2 is a flowchart of a method for protecting the touch-sensitive device of FIG. 1, in accordance with an exemplary embodiment.

FIG. 2 is a flowchart of a method from protecting the device 100, in accordance with an exemplary embodiment.

In step S201, the protection mode control module 31 switches the device 100 from the normal mode to enter the protection mode when the preset touch operation is exerted on the screen 10.

In step S202, the determining module 32 determines whether a touch operation is exerted on the screen 10.

In step S203, the determining module 32 determines whether a duration of the device 100 in the protection mode exceeds the preset time interval. If yes, the procedure goes to step S204, otherwise, the procedure goes to step S208.

In step S204, the comparing module 34 compares the touch size with the preset size. If the touch size is greater than or equal to the preset size, the procedure goes to step S205, otherwise, the procedure goes to step S206.

In step S205, the comparing module 34 compares the touch region with the preset region. If the touch region is not within the preset region, the procedure goes to step S206, otherwise the procedure goes to step S207.

In step S206, the protection control module 35 generates the alarm signal, and the procedure ends.

In step S207, the protection mode control module 31 switches the device 100 from the protection mode to the normal mode, and the procedure ends.

In step S208, the updating module 33 updates the preset size and region according to the touch size and touch region when the duration of the device 100 in the protection mode does not exceed the preset time interval, and the procedure returns to step S202.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A touch-sensitive device with a protection function, comprising:
    a touch-sensitive screen;
    a storage unit; and
    a processor comprising:
        a protection mode control module to switch the touch-sensitive device from a normal mode to a protection mode when a preset operation is exerted on the touch-sensitive screen;
        a determining module to determine whether a touch operation is exerted after the touch-sensitive device enters the protection mode, and further determine whether a duration of the touch-sensitive device in the protection mode exceeds a preset time interval when the touch operation is exerted on the screen;
        a comparing module to compare a touch size of the touch operation with a preset size stored in the storage unit when the duration of the touch-sensitive device in the protection mode exceeds the preset time interval; and
        a protection control module to generate an alarm signal when the touch size is less than the preset size.

2. The touch-sensitive device as described in claim 1, further comprising an updating module to update the preset touch size and a preset touch region according to the touch size and a touch region of the touch operation when the duration of the touch-sensitive device in the protection mode is less than or equal to the preset time interval.

3. The touch-sensitive device as described in claim 2, wherein the comparing module is further to compare the touch region of the touch operation with the preset touch region stored in the storage unit when the touch size is equal to or greater than the preset size, and the protection control module is further to generate the alarm signal when the touch size is equal to or greater than the preset size, and the touch region is not within the preset region.

4. The touch-sensitive device as described in claim 3, wherein the protection mode control module is further to switch the touch-sensitive device from the protection mode to the normal mode when the touch size is equal to or greater than the preset size, and the touch region is within the preset region.

5. A method for protecting a touch-sensitive device, the touch-sensitive device comprising a touch-sensitive screen, the method comprising:
    switching the touch-sensitive device from a normal mode to a protection mode when a preset operation is exerted on the touch-sensitive screen;
    determining whether a touch operation is exerted after the touch-sensitive device enters the protection mode, and further determining whether a duration of the touch-sensitive device in the protection mode exceeds a preset time interval when the touch operation is exerted on the screen;
    comparing a touch size of the touch operation with a preset size when the duration of the touch-sensitive device in the protection mode exceeds the preset time interval; and
    generating an alarm signal when the touch size is less than the preset size.

6. The method as described in claim 5, further comprising: updating a preset size and region according to a touch size and touch region of the touch operation when the duration of the touch-sensitive device in the protection mode is less than or equal to the preset time interval.

7. The method as described in claim 6, further comprising: comparing a touch region of the touch operation with a preset region when the touch size is equal to or greater than the preset size; and
    generating an alarm signal when the touch size is equal to or greater than the preset touch size, and the touch region is not within the preset touch region.

8. The method as described in claim 7, further comprising: switching the touch-sensitive device from the protection mode to the normal mode when the touch size is equal to or greater than the preset size, and the touch region is within the preset region.

9. A touch-sensitive device with a protection function, comprising:
    a touch-sensitive screen;
    a storage unit; and
    a processor comprising:
        a protection mode control module to switch the touch-sensitive device from a normal mode to a protection mode when a preset operation is exerted on the touch-sensitive screen;
        a determining module to determine whether a touch operation is exerted after the touch-sensitive device enters the protection mode, and further determine whether a duration of the touch-sensitive device in the protection mode exceeds a preset time interval when the touch operation is exerted on the screen;
        an updating module to update the preset touch size and a preset touch region according to a touch size and touch region of the touch operation when the duration of the touch-sensitive device in the protection mode is less than or equal to the preset time interval;
        a comparing module to compare a touch size of the touch operation with a preset size stored in the storage unit when the duration of the touch-sensitive device in the protection mode exceeds the preset time interval; and
        a protection control module to generate an alarm signal when the touch size is less than the preset size.

10. The touch-sensitive device as described in claim 9, wherein the comparing module is further to compare the touch region of the touch operation with the preset touch region stored in the storage unit when the touch size is equal to or greater than the preset size, and the protection control module is further to generate the alarm signal when the touch size is equal to or greater than the preset size, and the touch region is not within the preset region.

11. The touch-sensitive device as described in claim 10, wherein the protection mode control module is further to switch the touch-sensitive device from the protection mode to the normal mode when the touch size is equal to or greater than the preset size, and the touch region is within the preset region.

12. A method for protecting a touch-sensitive device, the touch-sensitive device comprising a touch-sensitive screen, the method comprising:
    switching the touch-sensitive device from a normal mode to a protection mode when a preset operation is exerted on the touch-sensitive screen;
    determining whether a touch operation is exerted after the touch-sensitive device enters the protection mode, and further determining whether a duration of the touch-sensitive device in the protection mode exceeds a preset time interval when the touch operation is exerted on the screen;

updating a preset size and region according to a touch size and touch region of the touch operation when the duration of the touch-sensitive device in the protection mode is less than or equal to the preset time interval;

comparing a touch size of the touch operation with a preset size when the duration of the touch-sensitive device in the protection mode exceeds the preset time interval; and generating an alarm signal when the touch size is less than the preset size.

13. The method as described in claim 12, further comprising:

comparing a touch region of the touch operation with a preset region when the touch size is equal to or greater than the preset size; and generating an alarm signal when the touch size is equal to or greater than the preset touch size, and the touch region is not within the preset touch region.

14. The method as described in claim 13, further comprising:

switching the touch-sensitive device from the protection mode to the normal mode when the touch size is equal to or greater than the preset size, and the touch region is within the preset region.

\* \* \* \* \*